(12) United States Patent
Kaestner et al.

(10) Patent No.: US 7,992,947 B2
(45) Date of Patent: Aug. 9, 2011

(54) METHOD FOR ACTIVATING A TWO-STAGE SWITCHING VALVE

(75) Inventors: Frank Kaestner, Bietigheim-Bissingen (DE); Thomas Bruex, Tuebingen (DE); Andreas Grimm, Tiefenbronn-Muehlhausen (DE); Otmar Bussmann, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 1152 days.

(21) Appl. No.: 10/580,883

(22) PCT Filed: Oct. 7, 2004

(86) PCT No.: PCT/DE2004/002225
§ 371 (c)(1),
(2), (4) Date: Apr. 13, 2007

(87) PCT Pub. No.: WO2005/051740
PCT Pub. Date: Jun. 9, 2005

(65) Prior Publication Data
US 2007/0273203 A1  Nov. 29, 2007

(30) Foreign Application Priority Data

Nov. 26, 2003 (DE) .................................. 103 55 849
Apr. 8, 2004 (DE) ......................... 10 2004 018 191

(51) Int. Cl.
*B60T 8/34* (2006.01)

(52) U.S. Cl. ....................... 303/119.2; 303/156; 303/199
(58) Field of Classification Search .................. 303/191, 303/199, 119.2, 156
See application file for complete search history.

(56) References Cited

U.S. PATENT DOCUMENTS 6,560,088 B1 * 5/2003 Beck et al. .................... 361/154

FOREIGN PATENT DOCUMENTS

| DE | 39 24 510 | 1/1991 |
|---|---|---|
| DE | 197 08 425 | 9/1998 |
| DE | 197 44 317 | 4/1999 |
| EP | 0 908 364 | 4/1999 |
| WO | 96 15926 | 5/1996 |
| WO | 97 02970 | 1/1997 |
| WO | 98 38069 | 9/1998 |
| WO | 98 57834 | 12/1998 |

* cited by examiner

*Primary Examiner* — Bradley T King
(74) *Attorney, Agent, or Firm* — Kenyon & Kenyon LLP

(57) ABSTRACT

A method for activating a two-stage switching valve including a first stage which has a small flow cross-section and a second stage which has a larger flow cross section, the switching valve being situated between a main brake cylinder and a hydraulic pump in a hydraulic brake system. The pressure equalization knock on opening the switching valve is substantially reduced by activating the switching valve in a first control phase via a control signal having a low amplitude, due to which only the first stage of the valve is first opened, and by activating the valve in a second phase via a control signal having a higher amplitude.

6 Claims, 3 Drawing Sheets

METHOD FOR ACTIVATING A TWO-STAGE SWITCHING VALVE

FIELD OF THE INVENTION

The present invention relates to a method for activating a two-stage switching valve.

BACKGROUND INFORMATION

Modern vehicles having vehicle dynamics control systems such as an ESP (Electronic Stability Program) or TCS (Traction Control System) include specially adapted brake systems. Brake systems of this type usually have multiple valves which may be used to switch between a foot brake operating mode and an automatic brake operating mode. FIG. 1 shows a hydraulic brake system 14 known from the related art which is provided to carry out a vehicle dynamics control function. Brake system 17 includes two symmetrically designed brake circuits 19a, 19b in an X or ∥ distribution pattern. Reference is thus made below only to part 19a shown on the left in FIG. 1.

The brake system includes a brake pedal 1, a brake booster 2 to which is connected a main brake cylinder 4 on which is situated a brake fluid reservoir 3. Operating brake pedal 1 produces a pressure in main brake lines 5a, 5b which acts upon brake shoes 11 of wheels 12 via a changeover valve 8a and the two intake valves 10a, 10b. The path in which pressure builds up during the operation of brake pedal 1 is identified by arrow b. A high-pressure switching valve 7a is closed in this state.

Upon the intervention of the vehicle dynamics control system, the brake pressure is automatically built up and distributed to predetermined wheels 12. For this purpose, brake system 17 includes a hydraulic pump 9a, which is activated by a control unit (not illustrated). When regulation takes place, changeover valve 8a is closed and high-pressure switching valve 7a is usually opened. Hydraulic pump 9a then delivers the hydraulic fluid along path a to brake shoes 11. The hydraulic fluid thus flows out of brake fluid reservoir 3 and passes through main brake line 5a, high-pressure switching valve 7a, an intake line 6a, hydraulic pump 9a and on through intake valves 10a, 10b to brake shoes 11. The brake pressure is modulated by intake valves 10a, 10b and discharge valves 13a, 13b, short-term pressure peaks being temporarily stored in an equalizing tank 14a.

To prevent equalizing tank 14a from overflowing, hydraulic pump 9a regularly pumps the excess brake fluid back toward brake fluid reservoir 3. High-pressure switching valve 7a is closed for this purpose. During the return transport of the brake fluid, intake line 6a of pump 9a may be evacuated. If the main stage of high-pressure valve 7a reopens in this state, the brake fluid flows abruptly into the evacuated space of intake line 6a. This process produces a very loud noise which is irritating to the driver (known as the pressure equalization knock) and a noticeable brake pedal movement, in particular if the admission pressure is in a range from approximately 10 bar to 50 bar.

High-pressure switching valve 7a is commonly designed in two stages, a first stage and a main stage, to enable valve 7 to be opened even at high differential pressures. The differential pressure present at switching valve 7a has a closing effect on the valve. Opening the first stage slightly decreases the differential pressure so that less energy is required to open the main stage.

High-pressure switching valve 7a is customarily driven by a pulse-width-modulated voltage signal (PWM signal). To ensure that valve 7a opens safely, in particular at high differential pressures, valve 7a is activated by a 100% PWM system for a period of approximately 20 ms at the beginning of the driving action. FIG. 2a shows the variation of the PWM control signal in the case of the previous activation operation. PWM signal 20 subsequently drops, for example, to 60%, depending on the pressure, due to the thermal stressability of valve 7a (see section 23 of control signal 20). This type of activation frequently causes the main stage of switching valve 7 to open abruptly, thus resulting in the aforementioned pressure equalization knock.

FIG. 2b shows the variation of the current flowing through a coil of the valve. Current drop 24 marks the point at which the first stage of the valve opens. The main stage opens immediately thereafter, resulting in the pressure equalization knock.

SUMMARY OF THE INVENTION

The object of the present invention is therefore to open a two-stage switching valve in such a manner that a pressure equalization knock does not occur or occurs only to a limited extent.

According to an important aspect of the present invention, the two-stage switching valve is activated in such a way that only the first stage opens during a first phase, and the main stage opens only after a predetermined period of time if a certain pressure compensation has occurred at the valve. To achieve this, the switching valve is activated, according to the present invention, by a low-level control signal during the first phase, this control signal initially opening only the first stage of the valve. After a predetermined period of time, the switching valve is then activated by a higher-level signal to ensure that the valve always opens completely (i.e., including the main stage). This two-stage activation delays the opening of the main stage, thus substantially reducing the pressure equalization knock.

The signal level during the first driving phase is preferably selected in such a way that the opening of the main stage of the switching valve is delayed by at least 10 ms, preferably by at least 30 ms. This allows a pressure compensation to occur at the valve, which reduces the pressure equalization knock.

According to a preferred embodiment of the present invention, the multi-stage activation operation is carried out only within a predetermined pressure range between, for example, 10 bar and 30 bar and, in particular, between 5 bar and 35 bar. For technical reasons, it is normally not possible to immediately open the main stage of the switching valve at pressures above 30 bar to 40 bar, even at maximum activation. Below 5 bar to 10 bar, the noise development and pedal feedback of the pressure equalization knock is already minimal. The pressure prevailing at the switching valve may be measured or estimated, for example using an admission pressure sensor.

The valve opening behavior is usually heavily dependent on voltage and temperature. The control signal for the valve is therefore preferably voltage- and/or temperature-compensated. For example, the voltage actually present at the valve may be measured and the coil temperature estimated.

DETAILED DESCRIPTION

Figure 3A:
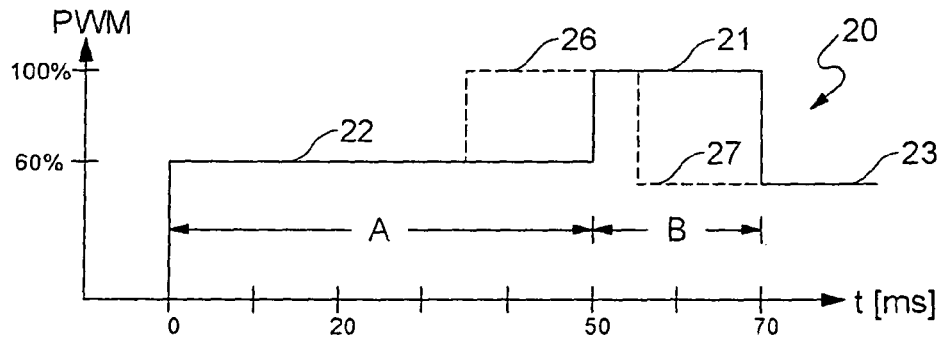
FIG. 3a shows the variation of the control signal according to an embodiment of the present invention

FIG. 3a shows the variation of a PWM control signal used to activate two-stage switching valve 7a, 7b, the first stage of the valve being opened first, and the main stage opening only after a predetermined delay period. Valve 7a, 7b is first activated by a PWM signal of, for example, 60%, and this level remains for a period of approximately 50 ms.

Figure 3B:
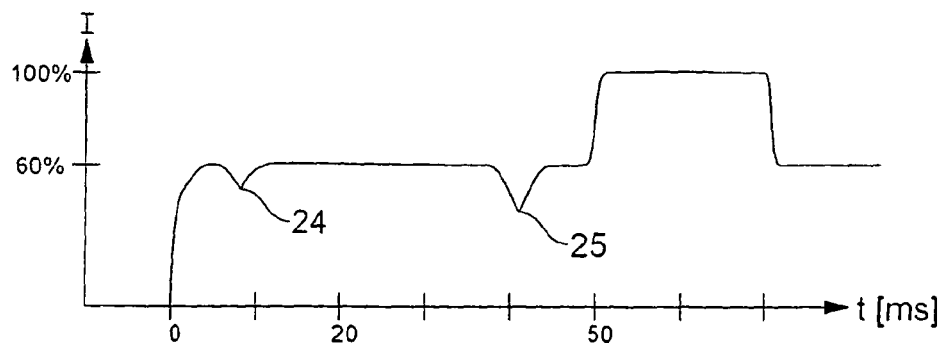
FIG. 3b shows the associated current variation in the coil of the high-pressure switching valve

FIG. 3b shows the associated current variation through the coil of valve 7a, 7b. After time t=0, the current initially rises to a first level, where it remains during first phase A. A first current drop 24 after approximately 5 ms indicates the opening of the first stage. The pressure compensation that now takes place reduces the closing force acting upon the valve so that the main stage of valve 7a, 7b also opens automatically after approximately 40 s. Second current drop 25 indicates the opening of the main stage. After, for example, 50 ms, the PWM signal is increased to 100% (see section 21 of the signal) to ensure that valve 7a, 7b does indeed always open all the way. After approximately 20 ms, the signal level is decreased to a lower level 23 to avoid overheating the valve.

Alternatively, it would be possible to apply high signal level 21 even before the main stage opens automatically to force the main stage of valve 7a, 7b to open prematurely and to accelerate the opening of valve 7a, 7b. The corresponding signal variation is represented by dotted lines 26 and 27, respectively. The time at which the main stage opens should preferably be at least 10 ms to 20 ms after the first stage opens to allow at least a slight pressure compensation to occur in the meantime at valve 7a, 7b.

Figure 4:
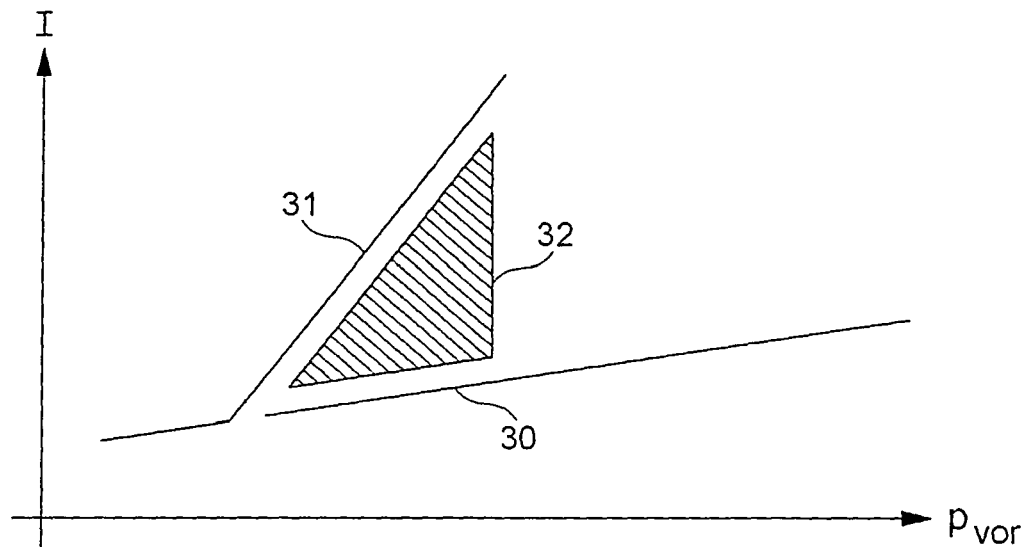
FIG. 4 shows the current variation for opening the first and main stages of the valve as a function of pressure.

FIG. 4 shows the Current of valve 7a, 7b that is required as a function of the admission pressure for opening the first or main stage. Line 30 marks the minimum current needed to open the first stage and line 31 the minimum current needed to open the main stage of valve 7a, 7b. As is apparent, the required minimum current increases as the admission pressure rises, since the pressure has a closing effect on the valve. Hatched area 32 marks the current range in which only the first stage of valve 7a, 7b is opened and which consequently is selectable for activation phase A.

Figure 1:
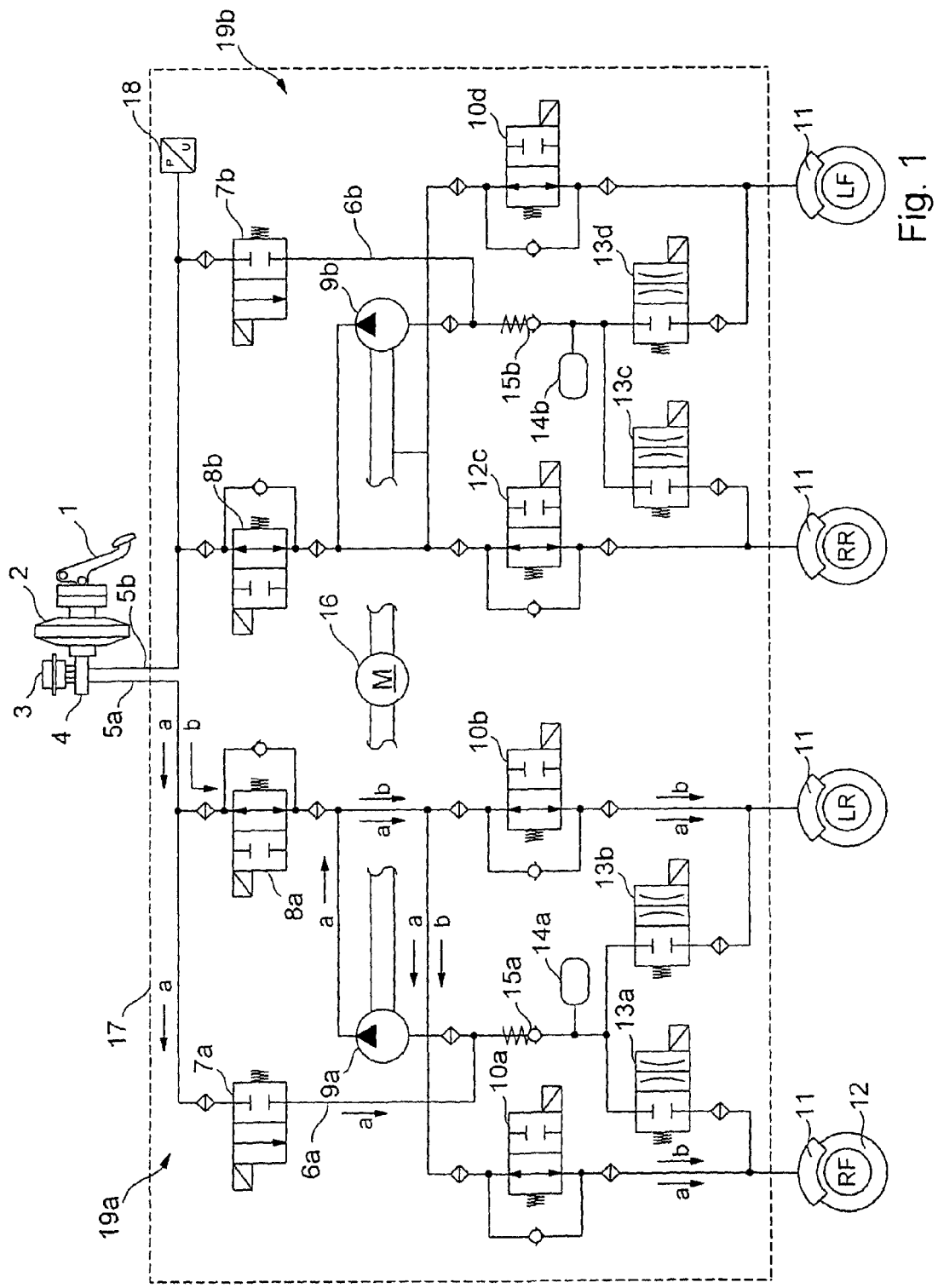
FIG. 1 shows a hydraulic brake system known from the related art.
Figure 2A:
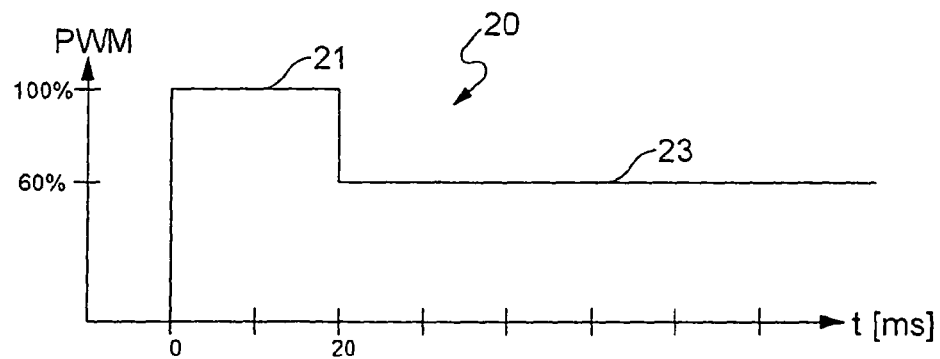
FIG. 2a shows the variation of a control signal for a high-pressure switching valve according to the related art
Figure 2B:
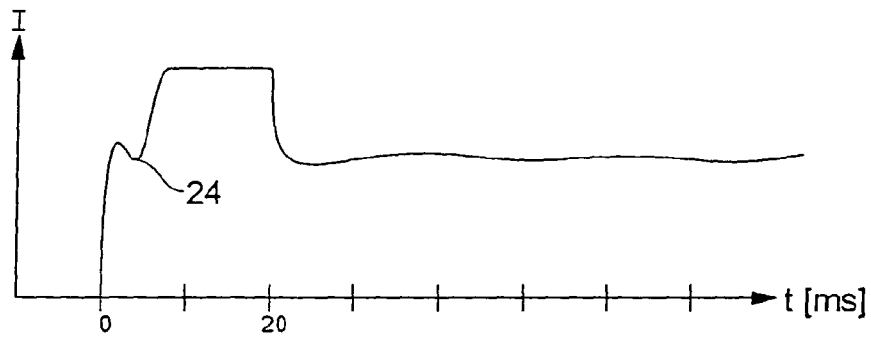
FIG. 2b shows the associated current variation in the coil of the high-pressure switching valve
Figure 5:
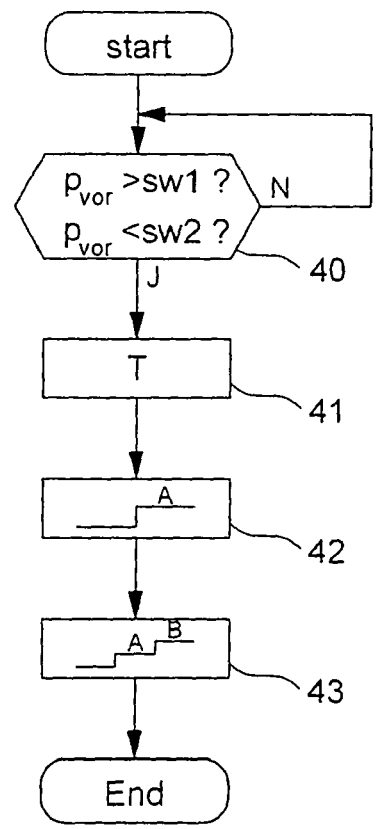
FIG. 5 shows a flow chart of the main steps of a method for activating a high-pressure switching valve.

FIG. 5 shows the main steps in a method for activating a two-stage high-pressure switching valve 7a, 7b. The algorithm may be stored, for example, in a control unit (not illustrated). In a first step 40, a first check is carried out to determine whether the admission pressure present at valve 7a, 7b lies within a predetermined range, e.g., between 5 bar and 35 bar. For this purpose, the admission pressure is measured by admission pressure sensor 29 (see FIG. 1) and compared with predetermined threshold values SW1, SW2. If admission pressure $p_{vor}$ lies within the predetermined pressure range (case J), instantaneous valve coil temperature T is estimated in step 41 (the temperature may also be measured). In step 42, valve 7a, 7b is then activated by a voltage- and temperature-compensated control signal 20 for a predetermined period of time, the control signal being of such magnitude that the first stage of valve 7a, 7b is opened, while the main stage remains closed for a predetermined period of at least 20 ms. In step 43, the control signal is then increased to ensure that the valve always opens all the way.

Activation of high-pressure switching valve 7a, 7b described above enables a pressure equalization knock to be substantially reduced.

| List of reference numerals | |
| --- | --- |
| 1 | Brake pedal |
| 2 | Power brake |
| 3 | Brake fluid reservoir |
| 4 | Main brake cylinder |
| 5a, 5b | Main brake lines |
| 6a, 6b | Intake line |
| 7a, 7b | High-pressure switching valve |
| 8a, 8b | Changeover valve |
| 9a, 9b | Hydraulic pump |
| 10a-10d | Intake valves |
| 11 | Brake shoes |
| 12 | Wheels |
| 13a-13d | Discharge valves |
| 14a, 14b | Equalizing tank |
| 15a, 15b | Check valves |
| 16 | Engine |
| 17 | Brake system |
| 18 | Admission pressure sensor |
| 19a, b | Brake circuits |
| 20 | PWM signal |
| 21 | High signal level |
| 22 | Low signal level |
| 23 | Low signal level |
| 24 | Opening of first stage |
| 25 | Opening of main stage |
| 26 | Premature opening of main stage |
| 27 | Low signal level |
| 30 | Minimum current for opening the first stage |
| 31 | Minimum current for opening the main stage |
| 32 | Intermediate current range |
| 40-43 | Method steps |
| A | First phase |
| B | Second phase |
| $P_{vor}$ | Admission pressure |

What is claimed is:

1. A method for activating a two-stage switching valve including a first stage having a smaller flow cross section and a second stage having a larger flow cross section, the switching valve being situated between a main brake cylinder and a hydraulic pump in a hydraulic brake system, the method comprising:

activating the switching valve in a first phase by a control signal having a small amplitude to first open only the first stage of the switching valve for a predetermined period of time; and activating the switching valve in a second phase by the control signal having a higher amplitude;

determining a differential pressure prevailing at the switching valve;

performing the activating in the first phase and the second phase only within a predetermined pressure range; and determining if an admission pressure lies within a predetermined pressure range., wherein the control signal is temperature-compensated and voltage-compensated;

wherein the pressure range lies between at least 5 bar and 35 bar, and wherein the control signal has a magnitude in the first phase such that the first stage of the switching valve is open for at least 10 ms before the second stage opens.

2. The method as recited in claim 1, wherein the pressure range lies between at least 10 bar and 30 bar.

3. The method as recited in claim 1, wherein the control signal has a magnitude in the first phase such that the first stage of the switching valve is open for at least 30 ms before the second stage opens.

4. The method as recited in claim 1, wherein the second phase begins no earlier than 30 ms after the beginning of the first phase.

5. A method for activating a two-stage switching valve including a first stage having a smaller flow cross section and a second stage having a larger flow cross section, the switching valve being situated between a main brake cylinder and a hydraulic pump in a hydraulic brake system, the method comprising:

activating the switching valve in a first phase by a control signal having a small amplitude to first open only the first stage of the switching valve for a predetermined period of time;

activating the switching valve in a second phase by the control signal having a higher amplitude determining a differential pressure prevailing at the switching valve;

performing the activating in the first phase and the second phase only within a predetermined pressure range; and determining if an admission pressure lies within a predetermined pressure range, wherein the control signal is temperature-compensated and voltage-compensated;

wherein the pressure range lies between at least 5 bar and 35 bar, and wherein the control signal has a magnitude in the first phase such that the first stage of the switching valve is open for at least 30 ms before the second stage opens.

6. The method as recited in claim 5, wherein the second phase begins no earlier than 30 ms after the beginning of the first phase, and wherein the predetermined pressure range lies between at least between 10 bar and 30 bar.

* * * * *